United States Patent [19]

Shafer et al.

[11] 4,102,128
[45] Jul. 25, 1978

[54] HAND PUMP SYSTEM FOR HYDRAULIC MOTOR

[75] Inventors: Jon L. Shafer, Houston, Tex.; William K. LeBlanc, Mansfield, Ohio

[73] Assignee: Shafer Valve Company, Mansfield, Ohio ; a part interest

[21] Appl. No.: 812,140

[22] Filed: Jul. 1, 1977

[51] Int. Cl.² .................. F15B 20/00; F15B 13/09
[52] U.S. Cl. ............................. 60/400; 60/402; 91/4 R
[58] Field of Search .................. 60/400, 402; 91/4

[56] References Cited

U.S. PATENT DOCUMENTS

| | | | |
|---|---|---|---|
| 2,791,093 | 5/1957 | Shafer | 60/400 |
| 3,089,430 | 5/1963 | Shafer et al. | 417/315 |
| 3,911,678 | 10/1975 | Shafer et al. | 60/400 |

Primary Examiner—Edgar W. Geoghegan
Attorney, Agent, or Firm—Hamilton, Renner & Kenner

[57] ABSTRACT

A hand pump system which allows normal automatic operation of a fluid motor operator for a pipeline valve by pipeline pressure, and also provides a stand-by hand pump while may be manually connected to a pressure fluid storage in the system for operating the fluid motor operator in either direction. The hand pump is connected into the system in such manner as to prevent accidental actuation of the pump handle by a pressure surge in the pipeline.

14 Claims, 7 Drawing Figures

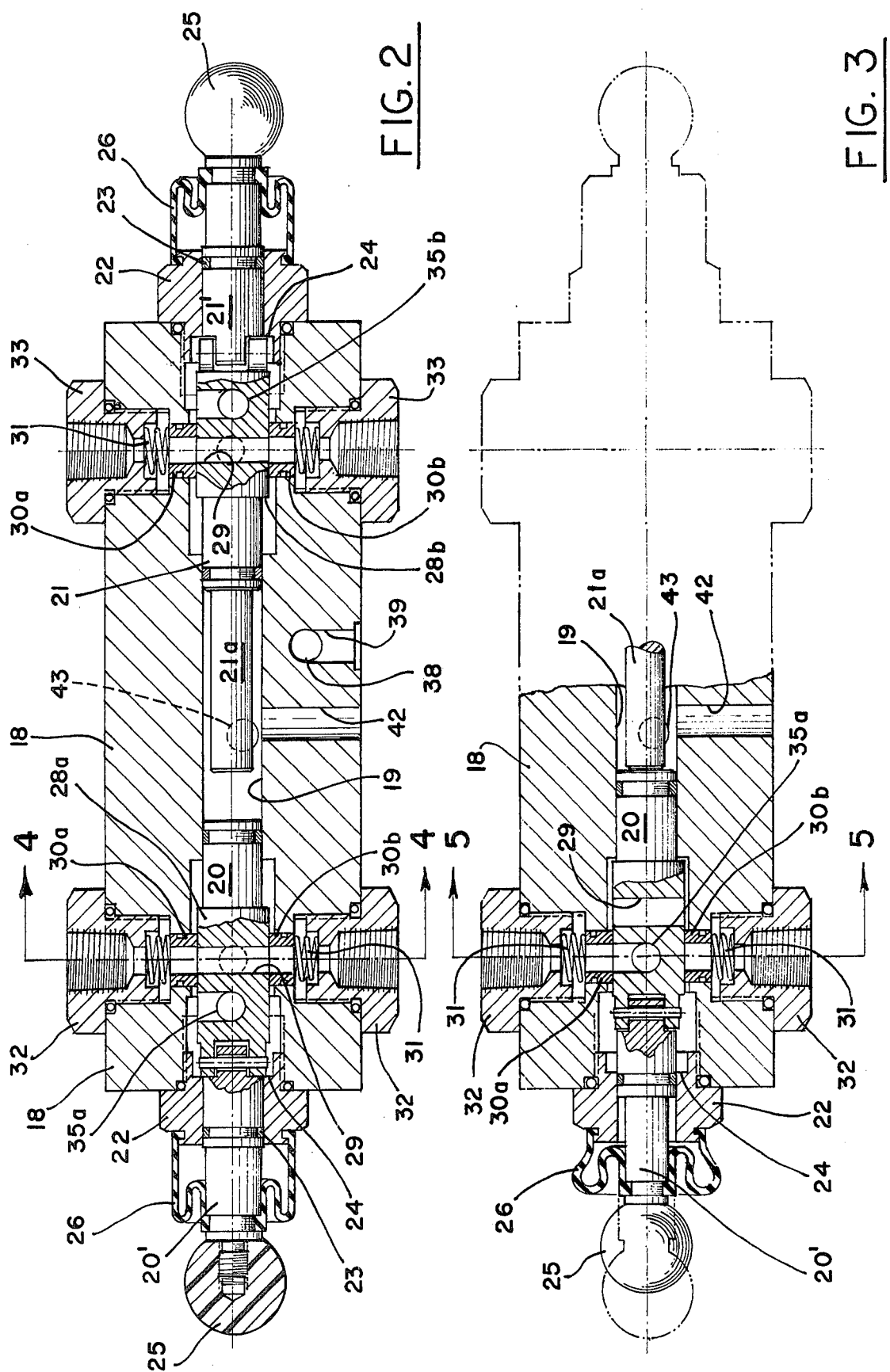

HAND PUMP SYSTEM FOR HYDRAULIC MOTOR

BACKGROUND OF THE INVENTION

Conventional hydraulic operators for pipeline valves are operated automatically by a fluid storage supply subjected to pipeline pressure when there is a substantial drop in pipeline pressure due, for example, to a line break which normally causes closure of the valve, and a stand-by hand pump is provided for manually operating the valve by using the fluid storage supply when the line pressure has failed. However, if a pressure surge occurs in the pipeline when the pump is being set for manual operation or is being operated, the effect of the pressure surge on the fluid storage supply may be to throw the pump handle outwardly with great force, thereby subjecting the people in the vicinity to great danger and injury.

U.S. Pat. No. 3,089,430 discloses a rotary control valve for such a hand pump having a safety shut-off located in the suction line to the pump, and the safety shut-off constitutes a piston which is exposed to atmospheric pressure and operates by differential pressure to close the suction line in the event of a pressure surge in the pipeline. This construction had the drawback that due to the exposure of the safety shut-off piston to the atmosphere, it often became corroded or was painted over so that it did not operate quickly enough to function properly.

This defect was recognized in U.S. Pat. No. 3,911,678, and a wholly enclosed shut-off piston was provided in the same type of rotary control valve to avoid the difficulties resulting from exposing the piston to the atmosphere. While those difficulties were overcome by this later construction, it was found in actual practice that under certain conditions there was still danger of the handle of the pump flying upwardly with great force. For example, if there is pressure left in the ram of the hand pump the pump handle still may fly upwardly as the control valve is changed from either extreme position to neutral position.

SUMMARY OF THE INVENTION

The present invention provides a hand pump system for a hydraulic valve operator which is completely foolproof in that there is no danger of injury from accidental or uncontrolled action of the pump handle regardless of how or when the pump is operated or in what position the control valve was left by the manual operator when the pressure supply becomes effective.

It is an object of the present invention to provide an improved hand pump control system in which the position of the control valve is self-correcting if the operator attempts to set it incorrectly.

Another object is to provide an improved hand pump control valve which positively prevents the improper flow of oil to the pressure supply storage while the pump is being operated.

A further object is to provide an improved hand pump system which eliminates cavitation in the hand pump.

Another object is to provide an improved hand pump control valve which has a manually operated pressure relief valve for always returning the pump handle to lowered position to enclose the pump piston rod at the end of the pump operation.

A still further object is to provide an improved hand pump control system in which the control valve is automatically shifted to neutral position shutting off the hand pump when the pipeline pressure comes on.

These and other objects are accomplished by the improvements comprising the present invention a preferred embodiment of which is disclosed by way of example in the accompanying drawings and defined in detail in the following specification. Various modifications and changes in details of construction are comprehended within the scope of the appended claims.

BRIEF DESCRIPTION OF THE DRAWINGS

FIG. 2 is an enlarged longitudinal sectional view of the control valve in position for automatic operation.

FIG. 3 is a partial sectional view similar to FIG. 2, showing the control valve in one position for a hand pumping operation.

DESCRIPTION OF A PREFERRED EMBODIMENT

Figure 1:
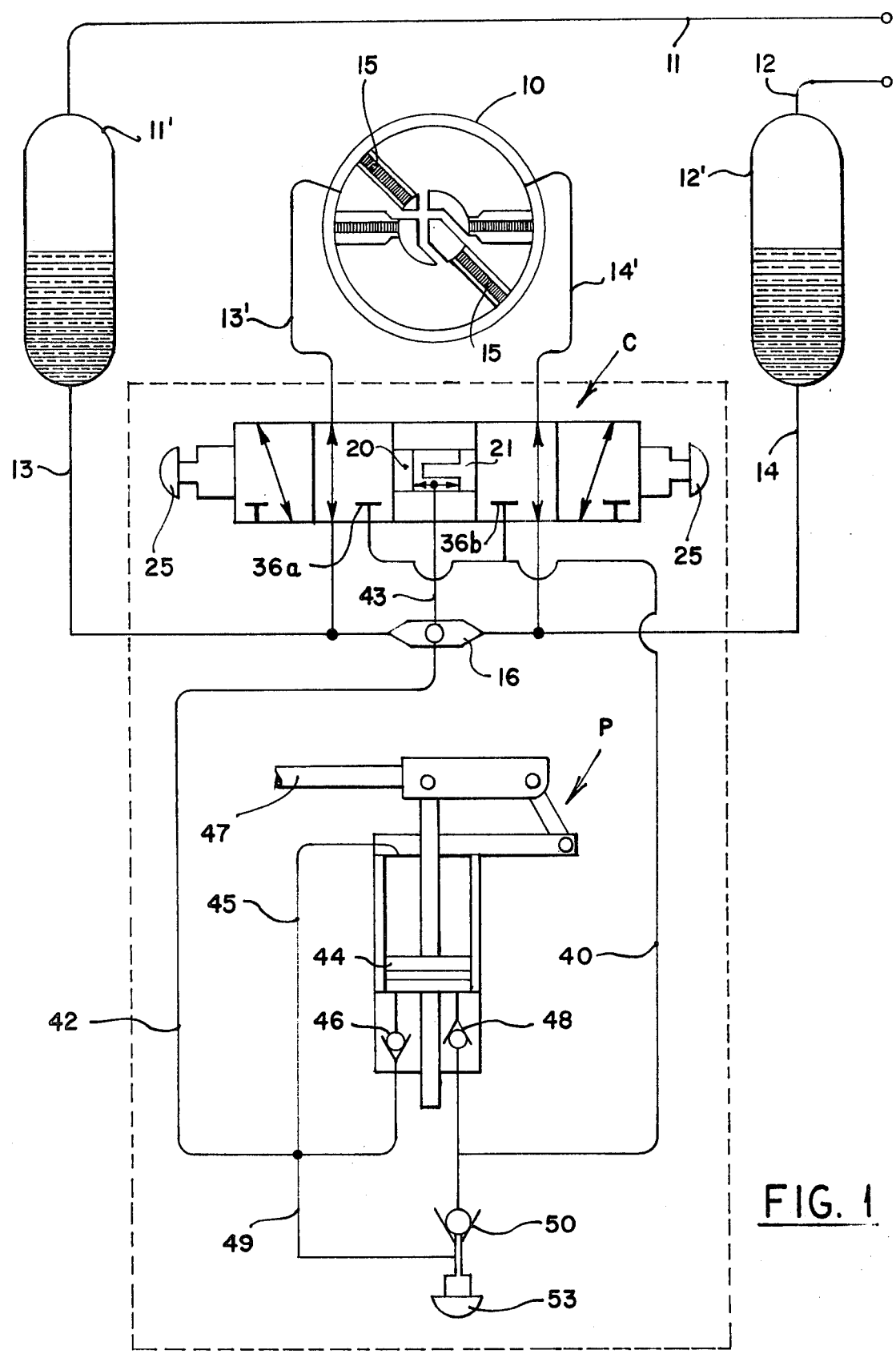
FIG. 1 is a schematic view showing the improved hand pump system including the control valve connected in circuit with the hydraulic operator and fluid storage tanks for automatically turning the operator in response to a drop in the supply pressure to the tanks.
Figure 4:
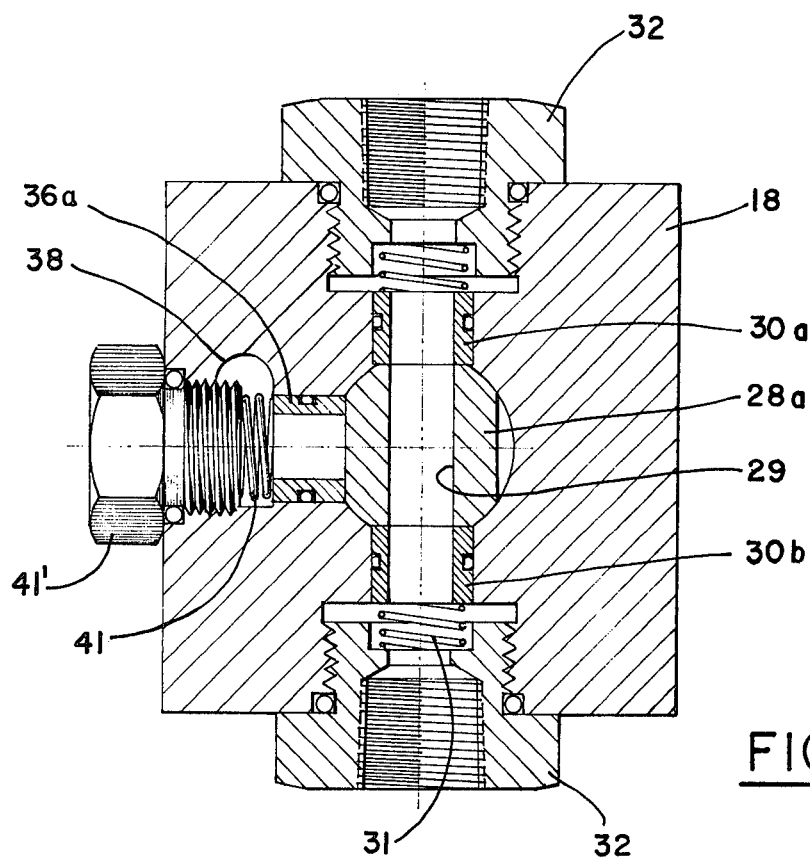
FIG. 4 is a sectional view on line 4—4 of FIG. 2.

Referring first to FIG. 1, the pressure fluid system for automatically operating the rotary fluid motor 10 which is operatively mounted on the valve stem of a rotary pipeline valve (not shown) may be similar to that shown in U.S. Pat. No. 3,911,678. The pressure fluid supply for normal automatic operation is derived from the pipeline which is connected by lines 11 and 12 to the upper ends of oil storage tanks 11' and 12', respectively, to subject them alternately to differential supply and discharge pressures for turning the motor in opposite directions.

The lines 13 and 14 from the bottoms of tanks 11' and 12' are normally connected through the control valve indicated generally at C to lines 13' and 14', respectively, which are connected to chambers on opposite sides of the rotor vanes 15 of the motor 10. In the position of the vanes in FIG. 1, if oil under pressure is supplied to the motor from tank 11' through lines 13 and 13' it will turn the rotor vanes 15 clockwise to close the pipeline valve and oil will exhaust through lines 14' and 14 to tank 12'. If the supply pressure is reversed the rotor vanes 15 will turn counterclockwise to open the pipeline valve.

The hand pump indicated generally at P is adapted to be manually connected by control valve C in a hydraulic circuit with the tanks and the fluid motor to open or close the pipeline valve when the normal pressure supply is not available.

During normal automatic operation, the control valve C is in its automatic or normally open position shown in FIGS. 1 and 2, in which it connects lines 13 and 13' and lines 14 and 14' directly through the valve. As shown in FIG. 1, lines 13 and 14 are connected together by a shuttle valve and level check indicated generally at 16 which automatically closes off the line on the low pressure side.

The control valve C may be described as a piston type three-way valve, and as shown in FIG. 2 has an elongated outer body 18 with an axial bore 19 with two pistons 20 and 21 axially reciprocatable in said bore. The pistons 20 and 21 have outer actuating portions 20' and 21' secured thereto slidable in bushings 22 screwed into the ends of the body 18, with O-rings 23 sealing against the interior surfaces of the bushings. Inner shoulders 24 on the bushings engage the outer ends of the pistons 20 and 21 to limit their axial outward movement. Ball-shaped palm handles 25 are secured on the outer ends of actuating portions 20' and 21' with surrounding dust covers 26 between the balls and bushings 22. The inner portions of the pistons are slidable in the interior bore 19 and have O-ring seals providing a sealed chamber between the inner ends of the pistons.

The inner end portion 21a of piston 21 has a reduced diameter to allow communication between certain ports to be described and the bore 19 around the piston. The inner ends of pistons 20 and 21 are spaced apart in the normal open position of FIG. 2 a distance which allows a predetermined axially inward movement of either piston. In other words, either piston can be pushed inwardly until it abuts the end of the other piston, and the depressed piston is then in position for a hand pumping operation.

The pistons 20 and 21 have intermediate portions 28a and 28b which are polygonal in cross section to provide flat exterior surfaces and ports 29 extend between two opposite surfaces to provide communication through two ring seals 30a and 30b abutting said surfaces in the position of FIG. 2. The ring seals are preferably held in abutment by springs 31 interposed between the seals and bushings 32 and 33 screwed into opposite sides of the body 18. Referring to FIG. 1, the bushings 32 connect to lines 13 and 13' and bushings 33 connect to lines 14 and 14'.

Figure 5:
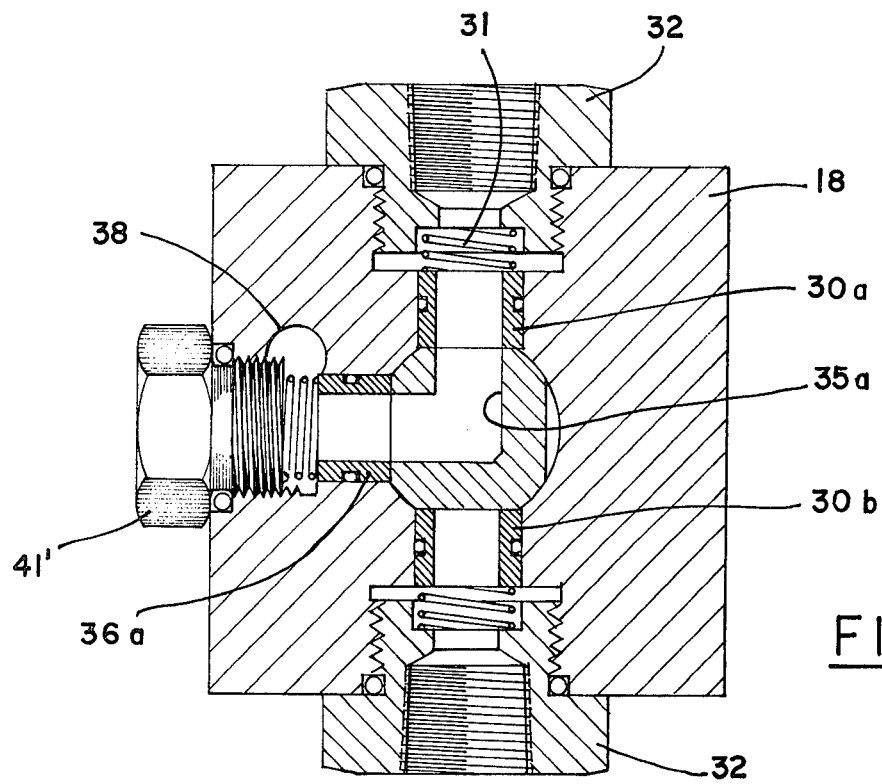
FIG. 5 is a sectional view on line 5—5 of FIG. 3.

The portions 28a and 28b of pistons 20 and 21 are provided axially outward of ports 29 with right-angled ports 35a and 35b, respectively. One end of each port is adapted to register with the bore of the adjacent ring seal 30a when the respective piston is pushed in, and at the same time the other end registers with the bore of a ring seal 36a or 36b at 90° to ring seal 30a, as seen in FIG. 5. The bores of ring seals 36a and 36b communicate with a passageway 38 in body 18, which is connected to a port 39 (FIG. 2) to which the discharge line 40 from the hand pump P is connected. Springs 41 urge the ring seals 36a and 36b against piston portions 28a and 28b and the springs are backed up by plugs 41'. The ring seals 36a and 36b are indicated schematically in FIG. 1.

The suction line 42 to the hand pump is connected to the shuttle valve 16 and also to the chamber 19 between the pistons 20 and 21 by a passageway 43 (FIG. 2). The hand pump has a piston 44 and the piston areas on opposite sides are equal. A safety line 45 (FIG. 1) connects opposite ends of the piston chamber with a suction check valve 46 in the line so that when either piston 20 or 21 is pushed in to the hand pumping position and the pump handle 47 is raised oil in the upper end of the chamber will flow back through the check valve 46 to fill the lower end of the chamber. As the pump handle is lowered the pump piston forces the oil from the lower end of the chamber through the check valve 48 in pump discharge line 40 and through line 40 and passageway 38 to ring seals 36a and 36b.

If piston 20 has been pressed in as in FIG. 5 to start the hand pumping operation and ring seal 36a is connected to pump discharge passageway 38, oil from the pump will be forced through right-angled port 35a and line 13' to rotate the motor 10 clockwise and close the pipeline valve. The oil exhausting from the motor will pass through line 14' and port 29 in piston 21 of the control valve and line 14 to tank 12'. During this downward stroke of the piston the oil pressure in passageway 38 will act against the end of ring seal 36b to hold it in positive sealing abutment with the portion 28b of piston 21.

The downward stroke of the pump piston 44 draws oil by suction from tanks 11' and 12' and also from the exhaust side of the motor 10, because the ball 16' in the shuttle valve 16 is in a neutral position and allows leveling of the oil levels in the tanks. The oil is sucked into the upper end of the pump chamber for the next discharge stroke and the next upward stroke again forces the oil from the upper end to the lower end of the pump chamber, thus eliminating cavitation in the pump.

At the end of a hand pumping operation, in this case when the pipeline valve has been fully closed by turning the rotor of motor 10 clockwise, the person operating the pump may have the pump handle in raised position and may not be able to fully lower it because of a hydraulic lock-up between the pump discharge check 48 and the fully closed vanes 15 in the motor 10. This condition is highly detrimental because the pump piston rod is exposed to weather conditions and to a likelihood of being painted by maintenance men, which would interfere with operation of the pump.

Figure 6:
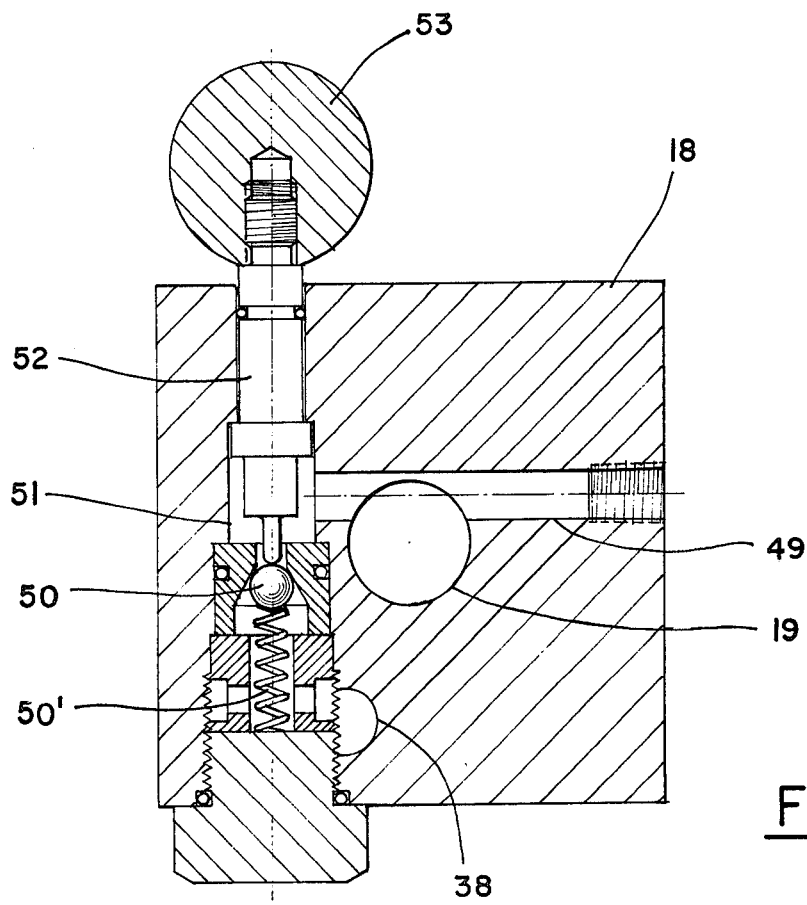
FIG. 6 is a sectional view showing the relief valve.
Figure 7:
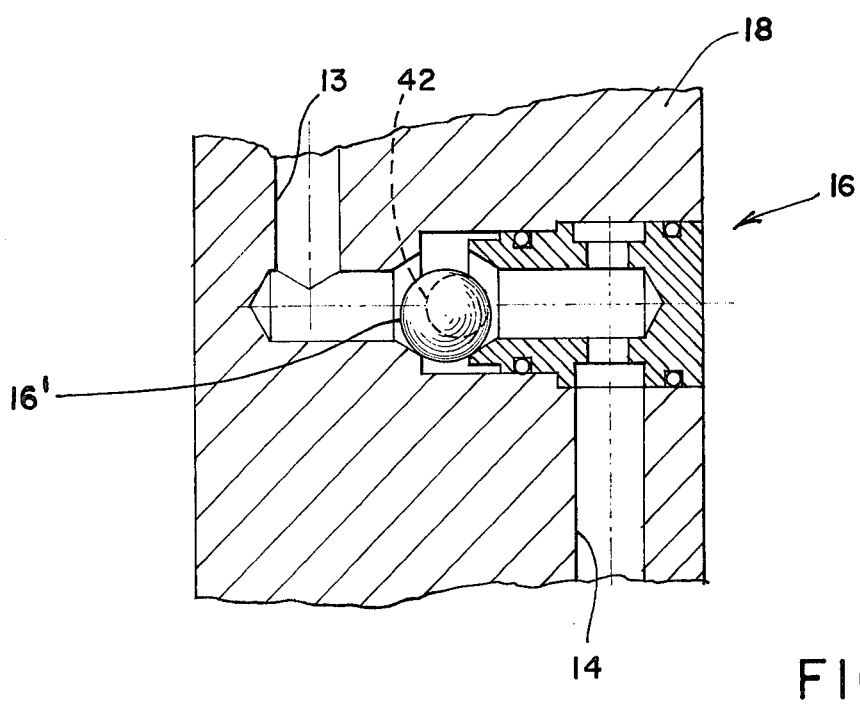
FIG. 7 is a sectional view of the shuttle valve.

The control valve C is preferably provided with the manually operated pressure relief valve shown in FIG. 6 for connecting the pump discharge passageway 38 through a passageway 49 to the chamber 19 between the pistons. The relief valve comprises a ball check 50 normally biased by spring 50' against a seat closing off the passageway 51 connecting passageway 38 and chamber 19, and a plunger 52 having handle 53 for momentarily depressing the ball to open the connecting pasagway 51. This relieves the pressure back through the shuttle valve and level check 16 to the tanks 11' and 12', after which the trapped oil in the lower end of the pump chamber can be displaced through check 48 by fully lowering the pump handle.

In the operation of the improved system, the pistons 20 and 21 can not be fully depressed simultaneously so that if the person operating the hand pump should accidentally depress the wrong piston, e.g., depressing piston 20 when the pipeline valve is fully closed and it is desired to open it, the hand pump would not be operable and he would then merely depress the other piston to automatically correct the relative positions of the pistons and render the hand pump operable to open the pipeline valve.

If either piston 20 or 21 has been depressed when either tank 11' or 12' is subjected to supply pressure for automatic operation of the motor 10 to open or close the pipeline valve, the bore 19 between the pistons acts as a pilot chamber instantly to return the depressed piston to the position of FIG. 2 for automatic operation of the motor 10. For example, assume that piston 20 is left depressed after hand pumping the motor 10 to close the pipeline valve, and tank 12' is pressurized to reopen the valve. The pressure from tank 12' instantly seats the shuttle valve ball closing off line 13 to tank 11' and flows through line 43 into the pilot chamber 19 to return the piston 20 to the position of FIG. 2.

In the unlikely event that both pistons are left partially depressed so that their inner ends abut in a half way position, when either tank is pressurized the pressure transmitted to the pilot chamber instantly returns both pistons to the position of FIG. 2 for automatic operation.

Regardless of the positions of the pistons 20 and 21 when either tank is subjected to supply pressure for automatic operation, there is no possibility of the pump handle being accidentally thrown upwardly creating a dangerous condition. This is because the pressure fluid from either tank communicates through the shuttle valve 16 into pump suction line 42 and safety line 45 which is connected to both ends of the pump chamber, and since the piston areas on opposite sides of pump piston 44 are equal, pressures on the piston are balanced, thereby holding the piston stationary.

At the same time the pressure fluid passes through passageway 49 and relief valve 50 to pump discharge line 40 which is connected to ring seals 36a and 36b. In the automatic position of control valve C shown in FIG. 2 both of these ring seals are thus pessurized against the solid flat surfaces of the pistons 20 and 21, providing positive seals to prevent pressure fluid from leaking to the tank on the discharge pressure side.

After an automatic pressure cycle has been completed, the volume of pressure fluid in the tank on the discharge side will be larger than in the tank on the pressure side. At this time, the ball 16' in the shuttle valve and level check unseats from the low pressure side and returns to the center position which allows the pressure fluid in tanks 11' and 12' to level out in the manner illustrated in FIG. 5, until the level in both tanks is the same.

The improved hand pump system provides a foolproof arrangement eliminating all danger from the hand pump handle being thrown when the pressure for automatic operation comes on, and in which the position of the control valve is manually correctible for a hand pump operation in either direction. Further, the incoming pressure for automatic operation instantly sets the control valve automatically in proper position regardless of in what position it may have been left.

We claim:

1. In combination with a hydraulic motor operable in opposite directions by pressure storage tanks when subjected alternately to supply and discharge pressures, a hand piston pump, a control valve normally connecting said motor and storage tanks and having shiftable elements for connecting said hand pump selectively with said storage tanks to move said motor in either direction, and conduit means for connecting both sides of said pump piston to pressure selectively from either of said tanks and for returning said elements to normal position, when said tanks are subjected to supply and discharge pressures.

2. In combination with a hydraulic motor as defined in claim 1, wherein the elements are arranged in tandem so as to connect the hand pump selectively with one storage tank at a time.

3. In combination with a hydraulic motor as defined in claim 2, wherein said conduit means is adapted to prevent cavitation in said hand pump during its operation.

4. In combination with a hydraulic motor as defined in claim 1, wherein said conduit means is adapted to prevent cavitation in said hand pump during its operation.

5. In combination with a hydraulic motor as defined in claim 1, wherein a manually operated pressure relief valve connects the discharge side of the pump to the tanks to permit lowering the piston at the end of a hand pumping operation.

6. In combination with a hydraulic motor as defined in claim 5, wherein the valve elements are arranged in tandem so as to connect only one element at a time selectively with one storage tank.

7. In combination with a hydraulic motor as defined in claim 5, wherein said conduit means is adapted to prevent cavitation in the hand pump during its operation.

8. In combination with a hydraulic motor as defined in claim 1, wherein the control valve has two axially shiftable piston elements in tandem, each for connecting said hand pump selectively with one storage tank for turning the motor in one direction.

9. In combination with a hydraulic motor as defined in claim 8, wherein each of the piston elements is adapted normally to connect one storage tank to one side of said motor.

10. In combination with a hydraulic motor as defined in claim 9, wherein said conduit means is adapted to prevent cavitation in said hand pump during its operation.

11. In combination with a hydraulic motor as defined in claim 10, wherein a manually operated pressure relief valve connects the discharge side of the pump to the tanks to permit lowering the piston at the end of a hand pumping operation.

12. In combination with a hydraulic motor as defined in claim 1, wherein the control valve has two axially shiftable piston elements in tandem, each for connecting said hand pump selectively with one storage tank for turning the motor in one direction and wherein a pilot chamber between the piston elements is connected selectively to one of said tanks to return said elements to normal position at the beginning of an automatic operation.

13. In combination with a hydraulic motor as defined to claim 12, wherein each of the piston elements is adapted normaly to connect one storage tank to one side of the motor.

14. In combination with a hydraulic motor as defined in claim 12, wherein a manually operated pressure relief valve connects the discharge side of the pump to the tanks to permit lowering the piston at the end of a hand pumping operation.

* * * * *